(12) United States Patent
Khafagy et al.

(10) Patent No.: US 10,501,080 B2
(45) Date of Patent: Dec. 10, 2019

(54) ELECTRIC PARKING BRAKE USAGE FOR VEHICLE POWERTRAIN OUT OF OPERATION CONDITIONS

(71) Applicant: FORD GLOBAL TECHNOLOGIES, LLC, Dearborn, MI (US)

(72) Inventors: Hafiz Shafeek Khafagy, Dearborn, MI (US); Kirk Pebley, Novi, MI (US); Eric Michael Rademacher, Royal Oak, MI (US); Hank L. Kwong, Farmington Hills, MI (US); Chad Michael Korte, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 834 days.

(21) Appl. No.: 15/000,592

(22) Filed: Jan. 19, 2016

(65) Prior Publication Data

US 2017/0203762 A1 Jul. 20, 2017

(51) Int. Cl.
| | |
|---|---|
| *B60W 30/18* | (2012.01) |
| *B60K 37/02* | (2006.01) |
| *B60W 10/08* | (2006.01) |
| *B60W 10/06* | (2006.01) |
| *B60W 10/18* | (2012.01) |
| *B60T 7/12* | (2006.01) |

(52) U.S. Cl.
CPC ....... *B60W 30/18109* (2013.01); *B60K 37/02* (2013.01); *B60T 7/122* (2013.01); *B60W 10/06* (2013.01); *B60W 10/08* (2013.01); *B60W 10/182* (2013.01); *B60T 2201/06* (2013.01); *B60W 30/18118* (2013.01); *B60W 2550/142* (2013.01); *B60W 2710/18* (2013.01); *B60Y 2300/18116* (2013.01); *B60Y 2300/18141* (2013.01); *Y10S 903/903* (2013.01)

(58) Field of Classification Search
None
See application file for complete search history.

(56) References Cited

U.S. PATENT DOCUMENTS

| | | | |
|---|---|---|---|
| 6,540,644 B2 | 4/2003 | Morimoto et al. | |
| 7,100,998 B2 | 9/2006 | Holl | |
| 8,579,765 B2 | 11/2013 | Yu et al. | |
| 2004/0104619 A1* | 6/2004 | Manaka | B60T 7/122 303/122.11 |
| 2014/0081562 A1* | 3/2014 | Kemwal | F02D 45/00 701/112 |
| 2014/0277973 A1* | 9/2014 | Nedorezov | B60R 25/00 701/53 |
| 2016/0001781 A1* | 1/2016 | Fung | B60W 40/08 701/36 |

FOREIGN PATENT DOCUMENTS

| | | |
|---|---|---|
| DE | 112011102870 T5 | 6/2013 |
| DE | 102014205176 A1 | 3/2015 |

\* cited by examiner

*Primary Examiner* — Colby M Hansen
(74) *Attorney, Agent, or Firm* — David Kelley; Brooks Kushman P.C.

(57) ABSTRACT

A vehicle includes a powertrain and an electric parking brake. A controller activates the electric parking brake in response to the powertrain transitioning to an off state that inhibits production of propulsive torque during an ignition cycle when a vehicle speed is less than a predetermined speed and in a presence of conditions that inhibit the powertrain from transitioning to an on state that permits production of propulsive torque.

10 Claims, 4 Drawing Sheets

ELECTRIC PARKING BRAKE USAGE FOR VEHICLE POWERTRAIN OUT OF OPERATION CONDITIONS

TECHNICAL FIELD

This application is generally related to operating an electric park brake in a vehicle.

BACKGROUND

A vehicle typically includes a parking brake that is configured to apply a braking force when the vehicle is parked. The parking brake can be integrated with the braking system and may apply braking force to a given axle. The parking brake is typically engaged by a driver using a foot pedal or a lever. The foot pedal or level is connected to a cable that engages and disengages the parking brake mechanism. Being a manually activated mechanism precludes use of the parking brake for automated functions.

SUMMARY

In some configurations, a vehicle includes a powertrain. The vehicle also includes an electric parking brake. The vehicle also includes a controller programmed to, in response to the powertrain transitioning to an off state that inhibits production of propulsive torque during an ignition cycle when a vehicle speed is less than a predetermined speed and in a presence of conditions that inhibit the powertrain from transitioning to an on state that permits production of propulsive torque, activate the electric parking brake.

Some configurations may include one or more of the following features. The vehicle in which the powertrain includes an engine configured to produce propulsive torque. The vehicle in which the powertrain further includes an electric machine configured to rotate a crankshaft of the engine prior to the engine being capable of producing propulsive torque and in which the conditions include the electric machine being unable to rotate the engine. The vehicle in which the conditions include the engine being in a stalled condition. The vehicle in which the controller is further programmed to autostart and autostop the engine. The vehicle may include a sensor configured to provide a signal indicative of a driver absence from an interior of the vehicle and in which the conditions include the signal being indicative of the driver absence during an autostop of the engine. The vehicle in which the powertrain includes at least one electric machine configured to provide propulsive torque. The vehicle in which the powertrain includes a transmission configured to transmit propulsive torque and in which the conditions include the transmission being unable to transmit propulsive torque. The vehicle may include a grade sensor, in which the electric parking brake is activated further in response to a signal from the grade sensor being indicative of the vehicle being on a grade that exceeds a predetermined grade. The vehicle may include a display, in which the controller is further programmed to display a message indicating a powertrain status and an electric parking brake status.

In some configurations, a method of controlling a vehicle includes activating by a controller an electric parking brake in response to a powertrain transitioning to an off state that inhibits production of propulsive torque when a speed of the vehicle is less than a predetermined speed and in a presence of conditions that inhibit the powertrain from transitioning to an on state that permits production of propulsive torque during an ignition cycle.

Some configurations may include one or more of the following features. The method in which the activating is further in response to detecting that the vehicle is on a grade having magnitude greater than a predetermined grade. The method may include displaying by the controller a message indicating a powertrain status and an activation status of the electric parking brake. The method may include detecting by the controller an absence of a driver from a vehicle interior and, in response to the absence of the driver, inhibiting the powertrain from transitioning to the on state.

In some configurations, a vehicle powertrain includes a controller programmed to, in response to the vehicle powertrain transitioning to an off state that inhibits production of propulsive torque during an ignition cycle when a vehicle speed is less than a predetermined speed and in a presence of conditions that inhibit the vehicle powertrain from transitioning to an on state that permits production of propulsive torque, request activation of an electric parking brake.

Some configurations may include one or more of the following features. The vehicle powertrain in which the controller is further programmed to, in response to requesting activation of the electric parking brake, request display of a message indicating that the electric parking brake is activated and that the vehicle powertrain is inhibited from transitioning to the on state. The vehicle powertrain in which the controller is further programmed to receive a signal indicative of a grade and to request activation of the electric parking brake further in response to the signal being indicative of the grade exceeding a predetermined grade. The vehicle powertrain in which the controller is further programmed to receive a signal indicative of an absence of a driver of the vehicle and to inhibit the vehicle powertrain from transitioning to the on state in response to the signal. The vehicle powertrain in which the conditions include conditions that inhibit an engine restart. The vehicle powertrain in which the conditions include conditions that inhibit a transmission from transmitting propulsive torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
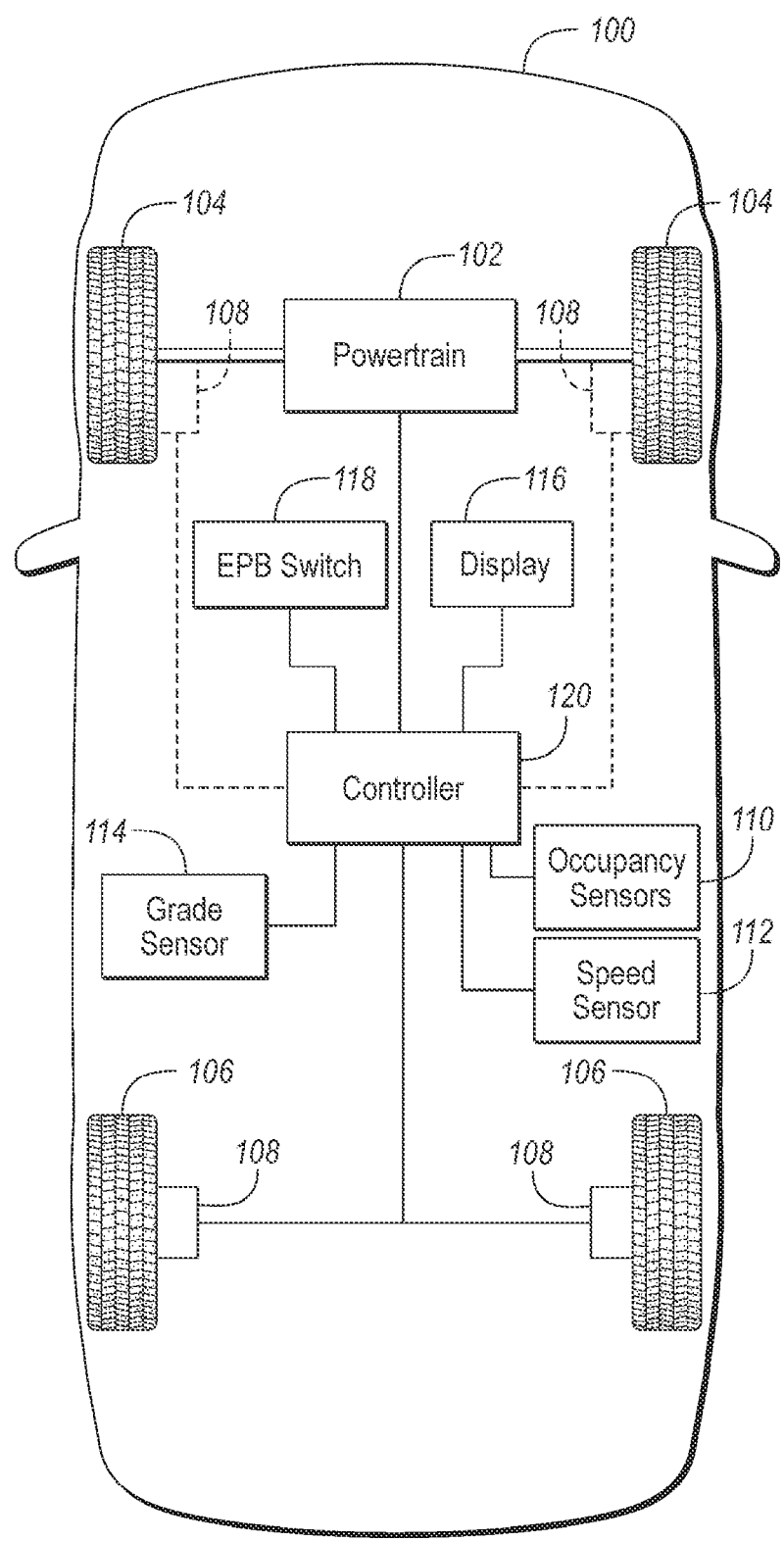
FIG. 1 is a block diagram of a possible vehicle configuration.

FIG. 1 depicts a block diagram of a vehicle 100. The vehicle 100 may include a powertrain 102 configured to provide propulsive torque to one or more drive wheels 104. The vehicle 100 may incorporate any of a variety of powertrain configurations. The powertrain 102 may include an internal combustion engine (ICE) or a diesel engine. The powertrain 102 may include one or more electric machines. In some powertrain configurations, the electric machine may be configured to rotate the engine for starting purposes. In some powertrain configurations, the electric machine may be configured to provide propulsive torque to the drive wheels 104. In a hybrid powertrain, the electric machine may be configured to provide propulsive torque and start the engine. The vehicle 100 may include one or more non-driven wheels 106.

Figure 3:
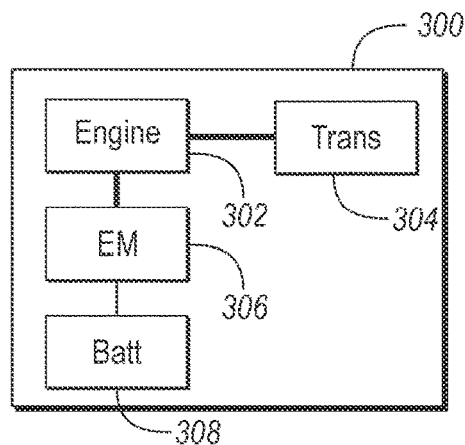
FIG. 3 is a diagram of a vehicle having a powertrain that includes an engine.

FIG. 3 depicts an example block diagram of a conventional powertrain or a mild-hybrid configuration 300. The mild-hybrid configuration 300 may include an engine 302 mechanically coupled to a transmission 304. The transmission 304 may be coupled to the drive wheels 104 to provide propulsive torque. The transmission 304 may be configured to adjust a gear ratio between the engine 304 and the drive wheels 104. The transmission 304 may be an automatic transmission having a fixed number of gears and shifting without driver intervention. The transmission 304 may be a manual transmission with fixed gears and shifting via driver intervention. The transmission 304 may be a continuously variable transmission (CVT) having a variable gear ratio between the engine and the drive wheels. The mild-hybrid configuration 300 may include a starter/alternator 306 (e.g., electric machine). The starter/alternator 306 may be electrically coupled to a battery 308. The starter/alternator 306 may be configured to rotate a crankshaft of the engine 304 for starting the engine 304 and generating electrical power for the battery 308. In a conventional powertrain, the starter/alternator may be separate electric machines—a starter and an alternator.

Figure 4:
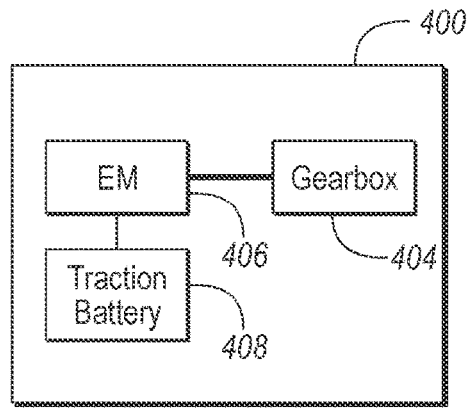
FIG. 4 is a diagram of a vehicle having an electric-only powertrain.

FIG. 4 depicts an example block diagram of a battery electric vehicle (BEV) powertrain 400. The BEV powertrain 400 may include an electric machine 406 configured to provide propulsive torque to the drive wheels 104. The electric machine 406 may be mechanically coupled to a gearbox 404 that is configured to provide a gear ratio between the electric machine and the drive wheels 104. The gearbox 404 may be mechanically coupled to the drive wheels 104. The gearbox 404 may have a single gear ratio. The electric machine 406 may derive power from a traction battery 408. A power electronics module (not shown) may electrically couple the electric machine 406 to the traction battery 408.

Figure 5:
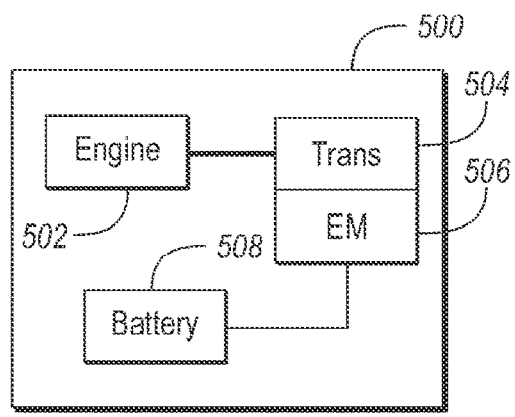
FIG. 5 is a diagram of a vehicle having a hybrid-electric powertrain.

FIG. 5 depicts an example block diagram of a full hybrid-electric (HEV) powertrain configuration 500. The HEV powertrain 500 may include and engine 502 mechanically coupled to a hybrid transmission 504. The hybrid transmission 504 may be a power-split hybrid configuration including a planetary gearset and coupled to one or more electric machines 506. The electric machines 506 may be electrically coupled to a traction battery 508.

The powertrain components (e.g., engine, transmission, electric machines, power electronics modules, traction battery) may each include a controller configured to control and monitor the associated powertrain component. Under certain conditions, the powertrain component may not be able to operate. Such conditions may be caused by fault conditions or routine maintenance issues. For example, there may be no fuel left to operate the engine. The associated controller may include circuitry and control logic to detect conditions in which the associated powertrain component is unable to operate.

Referring again to FIG. 1, during an ignition cycle, the powertrain 102 may be expected to, upon driver request, provide propulsive torque to the drive wheels 104 of the vehicle 100. An ignition cycle may be considered to be a period of time from a key-on event to a key-off event. Alternatively, the ignition cycle may be that period of time in which the vehicle is in a run condition. Under normal operating conditions, during an ignition cycle, the powertrain 102 may be capable of providing propulsive torque upon request. Under abnormal conditions, the powertrain 102 may be unable provide propulsive torque upon request due to some abnormal condition. For example, the engine may fail to start when requested.

The vehicle 100 may include one or more brake modules 108. The brake modules 108 may be configured to apply a torque to the wheels to resist rotation of the wheels. The brake modules 108 may be configured as disc brakes or drum brakes or some combination thereof. The brake modules 108 may incorporate a parking brake function. The parking brake function may include a mechanism that is configured to maintain a brake application at the wheels. The parking brake function may be applied to a subset of all the wheels. In some configurations, the parking brake function may be applied to all of the wheels. In a mechanical parking brake system, the brake mechanism may be activated by a cable attached to a lever or pedal in an interior of the vehicle 100. In an electric parking brake (EPB) configuration, the parking brake function may be activated electrically using a motor.

The vehicle 100 may include at least one controller 120. The controller 120 may include a processor for executing instructions. The controller 120 may include volatile and non-volatile memory for storing data and programs. Although depicted as a single module, the controller 120 may include multiple controllers communicating via a vehicle network.

The vehicle 100 may include one or more occupancy sensors 110. The occupancy sensors 110 may be configured to detect a presence or absence of a driver and/or passengers within a vehicle interior. For example, the occupancy sensor 110 may include a door sensor that provides a signal indicative of a door of the vehicle being in an open state. The driver may be assumed to have left the vehicle when the door is detected in an open state with the ignition on. The occupancy sensor 110 may include a weight sensor in a seat of the vehicle that is configured to provide a signal indicative of a weight that is located on the seat (e.g., driver or passenger). A presence of the driver may be detected when the weight exceeds a predetermined threshold. The controller 120 may communicate with other controllers in the vehicle via a communication network.

The vehicle 100 may include a speed sensor 112 configured to output a signal that is indicative of the speed of the vehicle 100. The speed sensor 112 may be one or more wheel speed sensors coupled to one or more of the wheels 104, 106. The speed sensor 112 may be an output shaft speed sensor coupled to an output shaft of the powertrain 102.

The vehicle 100 may include a grade sensor 114 configured to output a signal that is indicative a grade or slope that the vehicle 100 is located. The grade sensor 114 may be a longitudinal accelerometer having a signal that varies with the grade.

The vehicle 100 may include a display module 116 configured to display various status and operational information to the vehicle occupants. The display module 116 may include a display screen configured to display textual messages to the occupants. The display module 116 may include lamps or lights to indicate status in a binary format. The display module 116 may include a message or lamp that conveys the operational status of the powertrain 102. For example, a powertrain status lamp may illuminate when the powertrain 102 is inhibited from providing torque to the drive wheels 104.

The vehicle 100 may include an EPB switch 118 configured to activate and deactivated the EPB system. The EPB switch 118 may be located in proximity to the driver to allow activation and deactivation of the parking brake. The EPB switch 118 may be electrically coupled to the controller 120. The controller 120 may include circuitry for receiving the EPB switch signal and may be programmed to determine the status of the EPB switch 118. The controller 120 may debounce the signal from the EPB switch 118 to minimize the impact of noise. The EPB switch 118 may be configured to have a plurality of positions. For example, in a first position, the parking brake may be released to allow vehicle movement. In a second position, the parking brake may be applied to prevent vehicle movement. In some configurations, the EPB switch 118 may be a push button. The controller 120 may be programmed to toggle the parking brake position in response to a press of the push button. For example, when the vehicle 100 is parked, the driver may depress the EPB switch 118 to activate the EPB.

Figure 2:
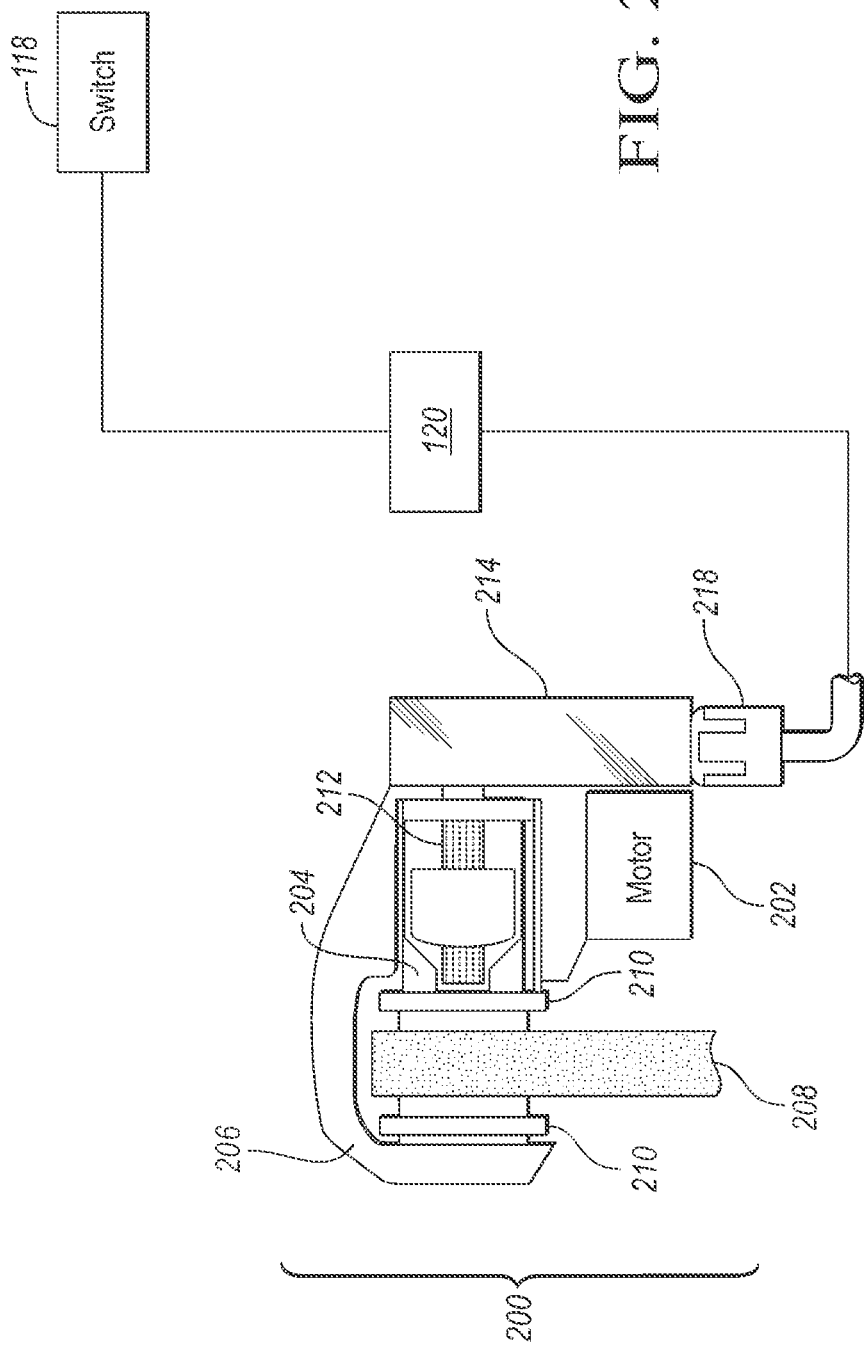
FIG. 2 is a diagram of a possible electric parking brake system.

The brake modules 108 may be configured with an electric parking brake 200 (EPB) feature. FIG. 2 depicts a possible implementation of an electric parking brake (EPB) 200. The EPB 200 may include a motor 202 to actuate a piston 204 and a caliper 206 for disc brakes. A brake system may be a disc-brake system and include a brake rotor 208. Brake pads 210 may be attached to each side of the brake rotor 208 so that the brake rotor 208 can freely move when the caliper 206 is not actuated. The brake piston 204 may be electrically actuated by an EPB motor 202. The EPB motor 202 may be linked to a drive screw 212 through a gear drive 214. The EPB motor 202 and/or gear drive 214 may be electrically linked to the controller 120 through connector 218. The controller 120 may be programmed to control a current distribution to the EPB motor 202.

The EPB 200 may be incorporated in each brake module of a selected axle of the vehicle, for example, the rear wheels. Alternatively, all four wheels may include the EPB 200 or any combination of the drive wheels 104 and non-driven wheels 106 can be fitted with EPB 200.

The controller 120 may be programmed to actuate the EPB motor 202 in response to an activation of the EPB switch 118 by the driver. Additionally, the controller 120 may be programmed to actuate the EPB motor 202 in response to a signal from another controller (e.g., vehicle powertrain controller) over the communication network. When an actuation signal is received, the controller 120 may instruct the EPB 200 to actuate and lock the wheels.

The control of the EPB 200 may be expanded to permit usage of the EPB 200 under different conditions. Such additional usage may enhance vehicle safety and reliability under certain situations.

In hybrid configurations in which the engine may be autostopped and autostarted, the EPB 200 may be activated under certain conditions. Under normal conditions, the engine may be autostopped when there is no propulsive torque request from the driver. When propulsive torque is subsequently requested, an engine autostart cycle may be initiated. However, under some conditions, the engine autostart may be unsuccessful. The engine may be unable to autostart for a number of reasons. For example, a loss of battery power that supplies the starter motor may result in the starter motor being unable to rotate the engine. Additionally, a failed starter motor may also cause the inability to restart the engine. Issues with the fuel system may also prevent the engine from restarting. For example, the fuel tank may be empty or a fuel line may be clogged.

When the primary power source of the powertrain 102 is incapable of transitioning to a state for providing propulsive torque to the drive wheels 104 it may be beneficial to apply the EPB 200 to prevent vehicle movement. Under this condition, the controller 120 may be programmed to activate the EPB 200. Activation of the EPB 200 may be requested when a vehicle speed is less than a predetermined vehicle speed. This may prevent the EPB 200 from activating under conditions in which the vehicle is moving to avoid an unexpected deceleration. Under conditions in which the vehicle is stopped, the EPB 200 may be applied to prevent further vehicle motion. Other conditions may be satisfied above the predetermined vehicle speed, and, if the conditions are still satisfied below the predetermined vehicle speed, the EPB 200 may be actuated when the vehicle speed falls below the predetermined vehicle speed. For example, a predetermined vehicle speed of 3 miles/hour may be configured.

The controller 120 may detect when the powertrain 102 is unable to produce propulsive torque. The controller 120 may monitor various sensors and subsystems for proper operation. The controller 120 may monitor a status of the powertrain 102 to detect a transition from an on or running state (e.g., powertrain 102 is capable of providing propulsive torque and/or actively providing propulsive torque) to an off or stopped state (e.g., powertrain 102 inhibited from providing propulsive torque). In a mild-hybrid vehicle, the on state may be characterized as the engine being autostarted and the off state may be characterized as the engine being autostopped. When the powertrain 102 is in the on state production of propulsive torque is possible.

Under normal conditions, the powertrain 102 may transition back and forth between the on and off states as the requested propulsive torque demand changes. Under some conditions, the powertrain 102 may be unable to transition from the off state to the on state. In some cases, a failed component may inhibit the powertrain 102 from transitioning to the on state. The controller 120 may be programmed to detect when transitions to the on state are inhibited.

In a vehicle in which the engine is the sole power source, an engine stall condition may cause the engine to stop (e.g., transition to an off state). As an ICE-only configuration may not be configured to autostop and autostart the engine, it may not be possible to automatically transition back to the on state without driver intervention. In such cases, a return of the powertrain to a running or on state is inhibited without driver intervention. The controller 120 may request activation of the EPB 200 in response to detecting an engine stall condition. To correct the condition, the driver may cycle the key/ignition to start a new ignition cycle. The EPB 200 may prevent movement of the vehicle 100 during the engine stall condition.

The EPB 200 may be actuated when the powertrain 102 has inhibited propulsive torque production during an ignition cycle without the ability to re-enable propulsive torque production. Once the powertrain 120 has lost the ability to re-enable propulsive torque production, the safest condition for the vehicle 100 may be a parked condition. Manual operation of the EPB 200 to deactivate the EPB 200 may be allowed to permit movement of the vehicle 100 (e.g., towing).

In a hybrid vehicle (mild and/or full) that can transition automatically between the off and on states, normal transitions should not affect the EPB 200 operation. Only those conditions in which the powertrain has transitioned to an off state without the possibility of returning to the on state may trigger activation of the EPB 200. The hybrid powertrain may still provide propulsive torque via the electric machines when the engine is inhibited from providing propulsive torque. However, the electric machines may only supply propulsive torque for as long as the traction battery has a sufficient state of charge. In a hybrid vehicle, application of the EPB 200 may be delayed until the electric machines are inhibited from supplying propulsive torque.

In a BEV powertrain configuration, the conditions for applying the EPB 200 may include a traction battery state of charge falling below a threshold at which propulsive torque can no longer be provided. An additional condition may include a temperature of the electric machine exceeding a predetermined temperature. Such a temperature condition may prevent thermally overstressing the electric machine. Further, any condition in which propulsive torque production is inhibited may cause activation of the EPB 200. Such conditions may include fault conditions in the battery, power electronics, and electric machines.

Other conditions that may inhibit the powertrain 102 from transitioning to the on state may include sensor problems. An accelerator pedal may include one or more sensors to provide signals indicative of a position of the accelerator pedal. The one or more sensors may be compared to determine the correctness of the accelerator pedal command. When the one or more sensor values do not agree on the accelerator pedal position, the powertrain may be inhibited from entering the on state. Other powertrain sensors may prevent transitions to an on state and may be monitored for activating the EPB 200.

When activated, the EPB 200 may remain activated until the next ignition cycle. In some configurations, the EPB 200 may remain activated until the driver manually deactivates the EPB 200 via the EPB switch 118.

Operation of the EPB 200 when the production of propulsive torque is inhibited can improve vehicle safety. The vehicle 100 may be maintained in a stopped condition to prevent movement while the powertrain cannot provide torque. For example, when the torque inhibition occurs on a grade, the vehicle 100 may roll backwards or forward due to the absence of torque. Application of the EPB 200 under this condition can prevent the vehicle movement and enhance safety.

Figure 6:
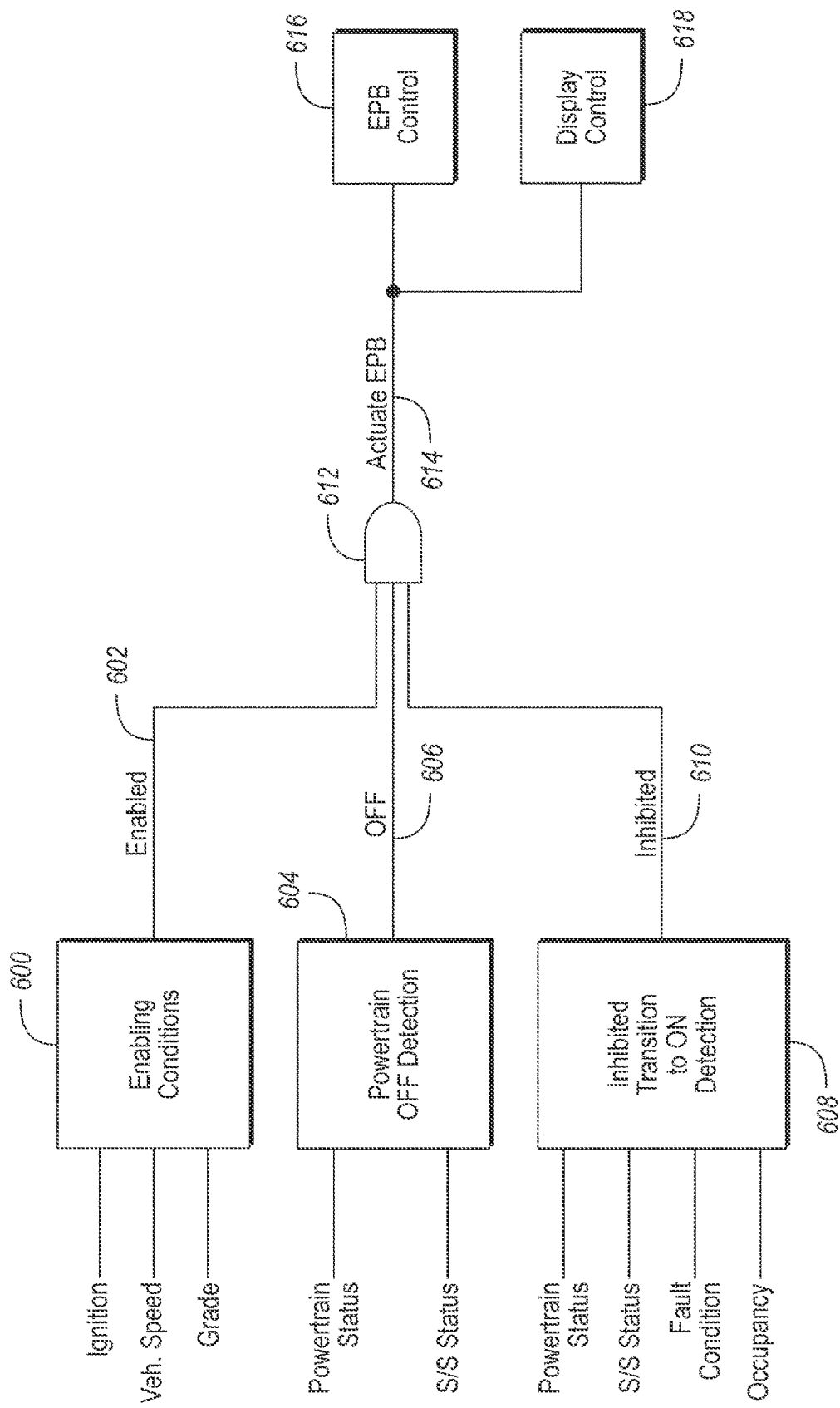
FIG. 6 is a block diagram of a possible control strategy for controlling the electric parking brake system.

FIG. 6 depicts a block diagram of possible control logic to implement the methods described. The various control blocks depicted may implement functions and features as described previously. The control blocks may be implemented by instructions programmed in the controller 120. A first control block 600 may be configured to determine certain enabling conditions for activating the EPB 200. The enabling conditions may include the ignition being in a run state, the vehicle speed being less than a speed threshold, and a grade exceeding a predetermined grade. Other enabling conditions are possible. The first control block 600 may output a first signal 602 that indicates whether the EPB activation is enabled.

A second control block 604 may be configured to detect when the powertrain is in an off state. The second control block 604 may receive inputs such as powertrain status and an engine start/stop status. The powertrain status signal may include the operating state of the powertrain and whether or not it is in a condition to provide propulsive torque. The second control block 604 may detect when the powertrain is in an off state and output a second signal 606 that indicates the off state of the powertrain. For example, the powertrain 102 may be in an off state during an engine autostop or an engine stall condition.

A third control block 608 may be configured to detect when transitions of the powertrain to the on state are inhibited. The third control block 608 may receive inputs such as powertrain status, engine start/stop status, fault conditions, and occupancy signals. The inputs may be processed and a third signal 610 may be output to indicate whether the transitions to the on state are inhibited. For example, the occupancy sensor may indicate the absence of the driver (e.g., driver has left the vehicle without cycling ignition off) or a fault condition is present that prevents the transition to the on state.

The first signal 602, the second signal 606, and the third signal 610 may be input to an AND function 612. The AND function 612 may output an EPB activation signal 614. The EPB activation signal 614 may be true when all of the input signals to the AND function 612 are true. The EPB activation signal 614 may be input to an EPB control block 616 and a display control block 618. The EPB control block 616 may activate the EPB 200 in response to the EPB activation signal 614 transitioning to a true value. EPB activation may continue until the EPB activation signal transitions to false. In response to the EPB activation signal 614 transitioning to true, the display control block 618 may activate one or more visual indicators to alert the driver that the EPB 200 is activated and the powertrain is inhibited from transitioning to an on state.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain;
   an electric parking brake; and
   a controller programmed to, in response to the powertrain transitioning to an off state that inhibits production of propulsive torque during an ignition cycle when a vehicle speed is less than a predetermined speed and in a presence of conditions in which the powertrain is unable to transition to an on state that permits production of propulsive torque, activate the electric parking brake.

2. The vehicle of claim 1 wherein the powertrain includes an engine configured to produce propulsive torque.

3. The vehicle of claim 2 wherein the powertrain further includes an electric machine configured to rotate a crankshaft of the engine prior to the engine being capable of producing propulsive torque and wherein the conditions include the electric machine being unable to rotate the engine.

4. The vehicle of claim 2 wherein the conditions include the engine being in a stalled condition.

5. The vehicle of claim 2 wherein the controller is further programmed to autostart and autostop the engine.

6. The vehicle of claim 5 further comprising a sensor configured to provide a signal indicative of a driver absence from an interior of the vehicle and wherein the electric parking brake is activated further in response to the signal being indicative of the driver absence during an autostop of the engine.

7. The vehicle of claim 1 wherein the powertrain includes at least one electric machine configured to provide propulsive torque.

8. The vehicle of claim 1 wherein the powertrain includes a transmission configured to transmit propulsive torque and wherein the conditions include the transmission being unable to transmit propulsive torque.

9. The vehicle of claim 1 further comprising a grade sensor, wherein the electric parking brake is activated further in response to a signal from the grade sensor being indicative of the vehicle being on a grade that exceeds a predetermined grade.

10. The vehicle of claim 1 further comprising a display, wherein the controller is further programmed to display a message indicating a powertrain status and an electric parking brake status.

* * * * *